United States Patent
Gamero Mendez et al.

(10) Patent No.: US 12,392,432 B2
(45) Date of Patent: Aug. 19, 2025

(54) SYSTEMS AND METHODS FOR FORMING A JOINT BETWEEN A PIPE AND A HOSE

(71) Applicant: General Electric Company, Schenectady, NY (US)

(72) Inventors: Jose Mikhail Gamero Mendez, Queretaro (MX); Miroslava Franco Barrera, Queretaro (MX); Cesar Octavio Vazquez Carmona, Queretaro (MX)

(73) Assignee: GE Infrastructure Technology LLC, Greenville, SC (US)

( * ) Notice: Subject to any disclaimer, the term of this patent is extended or adjusted under 35 U.S.C. 154(b) by 239 days.

(21) Appl. No.: 18/175,858

(22) Filed: Feb. 28, 2023

(65) Prior Publication Data
US 2024/0288106 A1 Aug. 29, 2024

(51) Int. Cl.
*F16L 13/02* (2006.01)
*F16L 33/34* (2006.01)
*F16L 33/01* (2006.01)
*F16L 33/26* (2006.01)

(52) U.S. Cl.
CPC ............ *F16L 33/34* (2013.01); *F16L 33/01* (2013.01); *F16L 33/26* (2013.01)

(58) Field of Classification Search
CPC ....... F16L 25/0036; F16L 25/00; F16L 33/00; F16L 33/34; F16L 33/26; F16L 13/02; F16L 13/0218; F16L 13/0236; F16L 13/0227; F16L 13/0281
USPC ........................................... 285/288.1–288.9
See application file for complete search history.

(56) References Cited

U.S. PATENT DOCUMENTS

| | | | |
|---|---|---|---|
| 5,263,747 A * | 11/1993 | Lefebvre | F16L 33/26 285/903 |
| 5,297,586 A | 3/1994 | McIntosh | |
| 5,404,632 A | 4/1995 | Zaborszki | |
| 5,511,720 A | 4/1996 | Zaborszki et al. | |
| 6,488,316 B1 | 12/2002 | Bowman | |

FOREIGN PATENT DOCUMENTS

| | | |
|---|---|---|
| CN | 110925503 A | 3/2020 |
| EP | 1719940 B1 | 12/2008 |
| WO | 2022046849 A1 | 3/2022 |

OTHER PUBLICATIONS

European Search Report Received for 24155808.9 on Jul. 1, 2024; 14 pps.
International Organization for Standardization. (2012). Pipework—Corrugated metal hoses and hose assemblies, (ISO Standard No. 10380:2012).

* cited by examiner

*Primary Examiner* — Aaron M Dunwoody
(74) *Attorney, Agent, or Firm* — Armstrong Teasdale LLP

(57) ABSTRACT

A method of connecting a pipe and a hose includes providing a transition assembly including a hose end, a pipe end opposite the hose end, and an inner surface defining a transition assembly passage extending through the transition assembly from the hose end to the pipe end, engaging the hose end of the transition assembly with the hose such that a first connection is formed between the transition assembly and the hose, and engaging the pipe end of the transition assembly with the pipe such that a second connection between the transition assembly and the pipe is formed. The second connection is spaced an axial distance from the first connection.

20 Claims, 7 Drawing Sheets

SYSTEMS AND METHODS FOR FORMING A JOINT BETWEEN A PIPE AND A HOSE

BACKGROUND

The field of the disclosure relates to creating a joint between a pipe and a hose, and more particularly to, systems and methods for joining a pipe and a flexible hose together using a transition assembly.

Conventionally, a joint may be created between a pipe and a hose by manually forming a series of welds. The hose may be a flexible metal hose having multiple layers, such as an inner corrugated layer, a braided metal intermediate layer, and/or a protective outer layer. The joint may be initially formed with an internal weld that extends across the multiple layers of the flexible metal hose. An external weld may then be formed across the internal weld and the pipe, such that during the process, the internal weld becomes at least partially obscured by the external weld.

After the internal and external welds are formed, the joint is inspected. However, because the internal weld is at least partially obscured, a visual inspection is not sufficient and as such, various other inspection methodologies must be used, including pressure testing, vacuum box testing, nondestructive testing, and/or radiography, to determine the leak tightness and robustness of the joint. Furthermore, if a leak is identified, it may be challenging to repair and/or replace the joint and depending on the severity of the leak and/or the relative location of the leak, in some cases, the whole assembly must be scrapped. For example, if a leak forms between the internal weld and the hose, and/or a leak is found between the boundary of the internal weld and the external weld, there may not be any access to such a leak location to repair or replace the weld. Furthermore, because of the location of the joint, sharp edges may be formed and consequently, cracks may propagate within the joint between and through the internal weld and the external weld.

Conventionally, the internal and external welds are formed manually, at least partially because the first weld extends across along an irregular boundary of the multiple exposed layers of the hose. Subsequently, the external weld is formed across the irregular boundary of the hose and the internal weld. Furthermore, manual welding may be required because clamping of the working pieces, required for automatic welding operations, may deform and/or perforate the thin layers of the hose.

Accordingly, a need exists for an improved method of connecting the joint between a pipe and a hose that alleviates the aforementioned drawbacks of conventional joint forming processes used to join a hose and pipe.

SUMMARY

In one aspect, a method of connecting a pipe and a hose is provided. The method includes providing a transition assembly including a hose end, a pipe end opposite the hose end, and an inner surface defining a transition assembly passage extending through the transition assembly from the hose end to the pipe end. The method includes engaging the hose end of the transition assembly with the hose such that a first connection is formed between the transition assembly and the hose. The method further includes engaging the pipe end of the transition assembly with the pipe such that a second connection between the transition assembly and the pipe is formed. The second connection is spaced an axial distance from the first connection.

In another aspect, a transition assembly for connecting a pipe to a hose is provided. The transition assembly includes a pipe end formed with a first surface that is shaped complementary to a pipe contact surface of the pipe and an opposite hose end formed with a second surface that is shaped complementary to a hose contact surface of the hose. The transition assembly further includes an inner surface defining a transition assembly passage that extends between the pipe and hose ends. A first connection is formed when the hose is engaged with the hose end and a second connection is formed when the pipe is engaged with the pipe end. A second connection is spaced an axial distance from the first connection.

In another aspect, a connection system for connecting a hose and a pipe is provided. The connection system includes a pipe including an outer surface having a pipe contact surface and an inner surface defining a pipe passageway and a hose including an inner layer and at least one secondary layer. The inner layer includes a hose contact surface and defines a hose passage. The system includes a transition assembly including a pipe end formed with a first surface that is shaped complementary to the pipe contact surface of the pipe, an opposite hose end formed with a second surface that is shaped complementary to the hose contact surface of the hose, and an inner surface defining a transition assembly passage that extends between the pipe and hose ends. A first connection is formed when the hose is engaged with the hose end and a second connection is formed when the pipe is engaged with the pipe end. The second connection is spaced an axial distance from the first connection.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not. Furthermore, references to "one embodiment" are not intended to be interpreted as excluding the existence of additional embodiments that also incorporate the recited features. Moreover, unless explicitly stated to the contrary, embodiments "including" or "having" an element or a plurality of elements having a particular property may include additional such elements not having that property.

Figure 1:
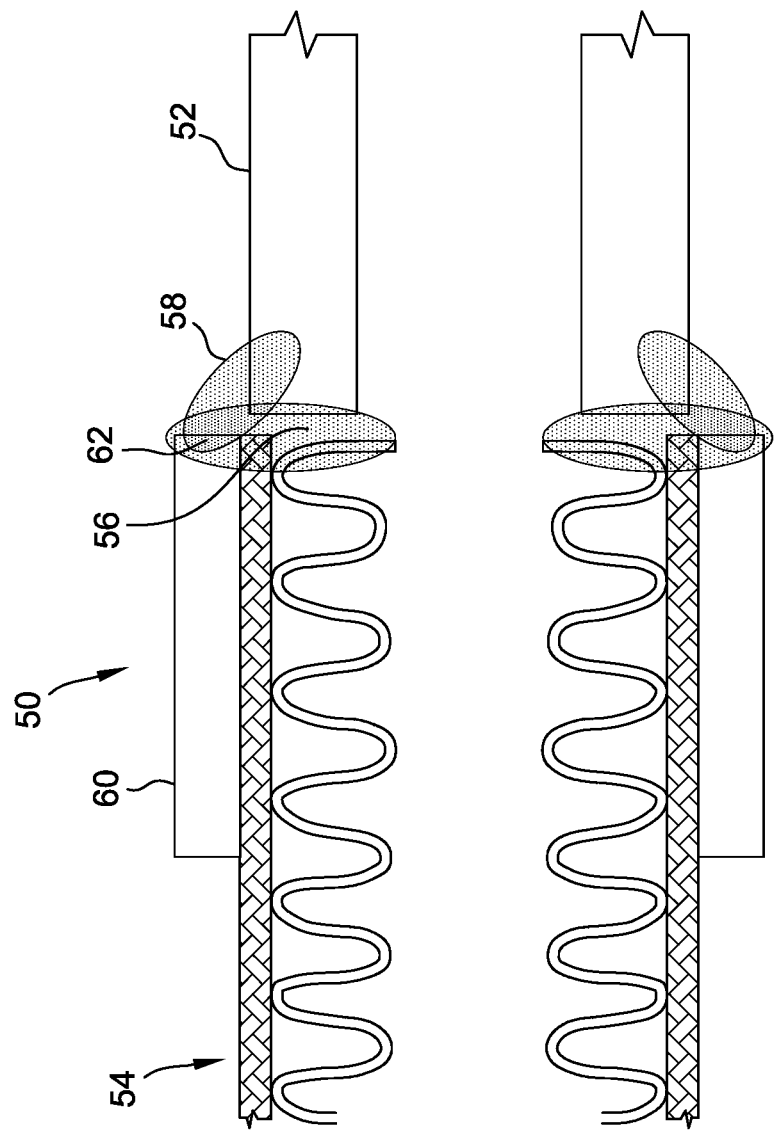
FIG. 1 is a schematic illustration of a conventional joint formed between a hose and a pipe.

Referring now to the drawings, FIG. 1 illustrates an exemplary conventional joint 50 between a pipe 52 and a hose 54. In the exemplary embodiment, joint 50 is formed with both an internal weld 56 and an external weld 58, and includes an optional collar 60 that circumscribes the hose 54. During the process, the internal weld 56 is initially formed on a front-end surface of the hose 54, e.g., the weld 56 extends across one or more layers of the hose 54, and/or a front-end surface of the collar 60. Subsequently, after the internal weld 56 is formed, the external weld 58 is then extended across at least a portion of the internal weld 56 and the pipe 52. When completed, the external weld 58 is in direct contact with the internal weld 56 such that a boundary 62 is created between the internal and external welds 56 and 58, respectively. As seen in FIG. 1, after the external weld 58 is complete, at least a portion of the internal weld 56 is "covered" and is visually obstructed. For example, in the exemplary embodiment, after the external weld 58 is complete, the internal weld 56 may not be visible or accessible. As such, the internal weld 56 may not be visually inspected, or manually reformed (e.g., reheated, patched, etc.), repaired, and/or replaced, after the external weld 58 is complete.

Figure 2:
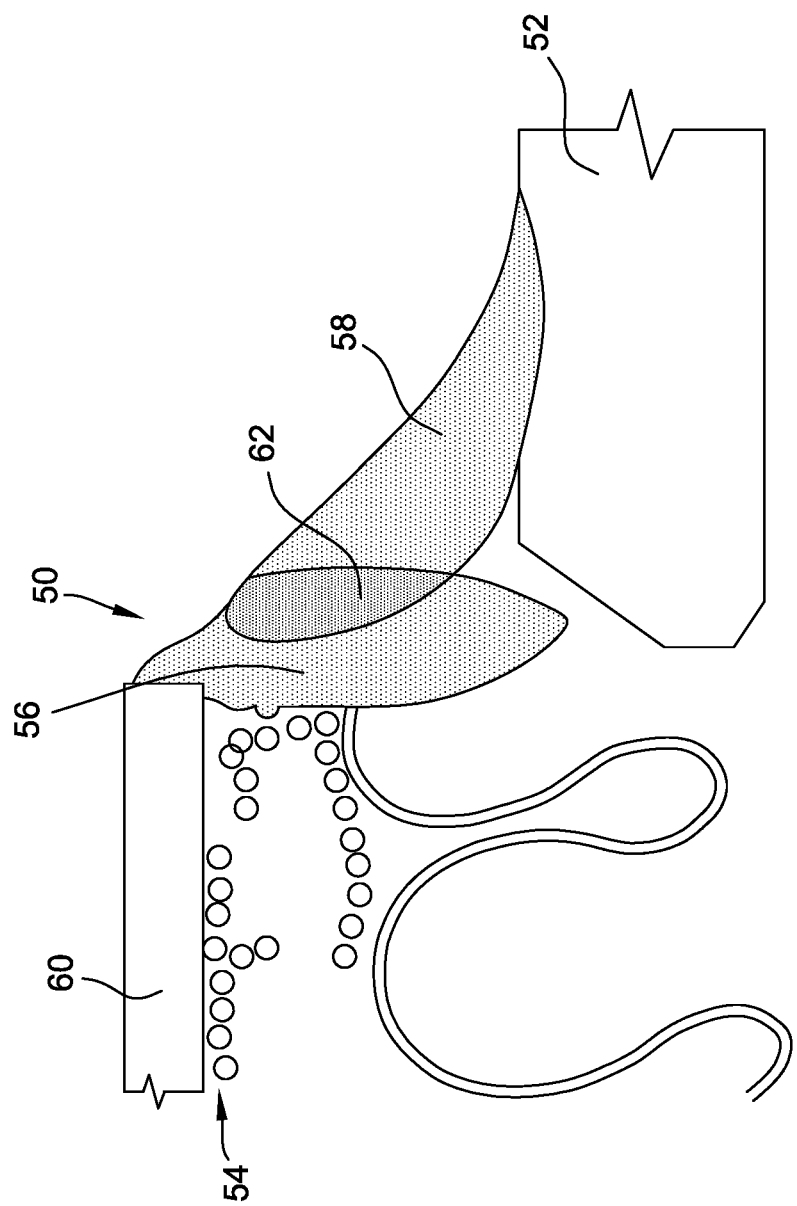
FIG. 2 is an image of an exemplary sharp edge formation that consequently may form a fracture in a conventional joint formed between a hose and a pipe.

FIG. 2 depicts an image of an exemplary crack formation that may form the boundary 62 created between the internal weld 56 and the external weld 58 of the joint 50. Over time, continued exposure to flexing, thermal strains, and/or movement may cause cracking to develop in the boundary 62. Moreover, depending on the types of materials used in fabricating the pipe 52 and/or hose 54, the integrity of the welds 56 and/or 58, a grain boundary may form at the boundary 62 defined between the welds 56 and 58. Stresses, strains, crack propagation, and/or creep may be increased within at least some known grain boundaries.

With reference to FIGS. 3-6, exemplary embodiments are described herein that relate to methods and systems for use in forming a joint 100, such as a sealed connection, between the pipe 52 and the hose 54. The joint 100 formed includes a transition assembly 102 including a pipe connection end 104 and an opposite hose connection end 106. The transition assembly 102 includes an outer surface 112 and an inner surface 114 that defines a transition assembly passage 116. The transition assembly passage 116 extends completely through the transition assembly 102. The transition assembly 102 may engage with both the hose 54 and the pipe 52. For example, the pipe connection end 104 may couple with the pipe 52, and hose connection end 106 may engage the hose 54, such that the hose 54 and the pipe 52 are engaged at opposing ends of the transition assembly 102 thereby separating the hose 54 and the pipe 52 in both an axial A direction and/or a radial R direction. The transition assembly 102 maintains at least one of an axial separation $A_{102}$ and/or a radial separation $R_{102}$, between the hose 54 and the pipe 52 such that two independent connections may be formed, i.e., a hose connection 108 between the hose 54 and the transition assembly 102, and a pipe connection 110 between the pipe 52 and the transition assembly 102.

In the exemplary embodiment, the pipe 52 includes an inner surface 120 that defines a pipe passage 122 extending through the pipe 52. The pipe 52 includes an outer surface 124. The inner surface 120 and the outer surface 124 may be cylindrical, such that the pipe 52 has an inner radius $R_{52i}$ and an outer radius $R_{52o}$. The pipe 52 may also include a pipe contact surface 126 that contacts the transition assembly 102 when the transition assembly 102 engages the pipe 52.

Figure 3:
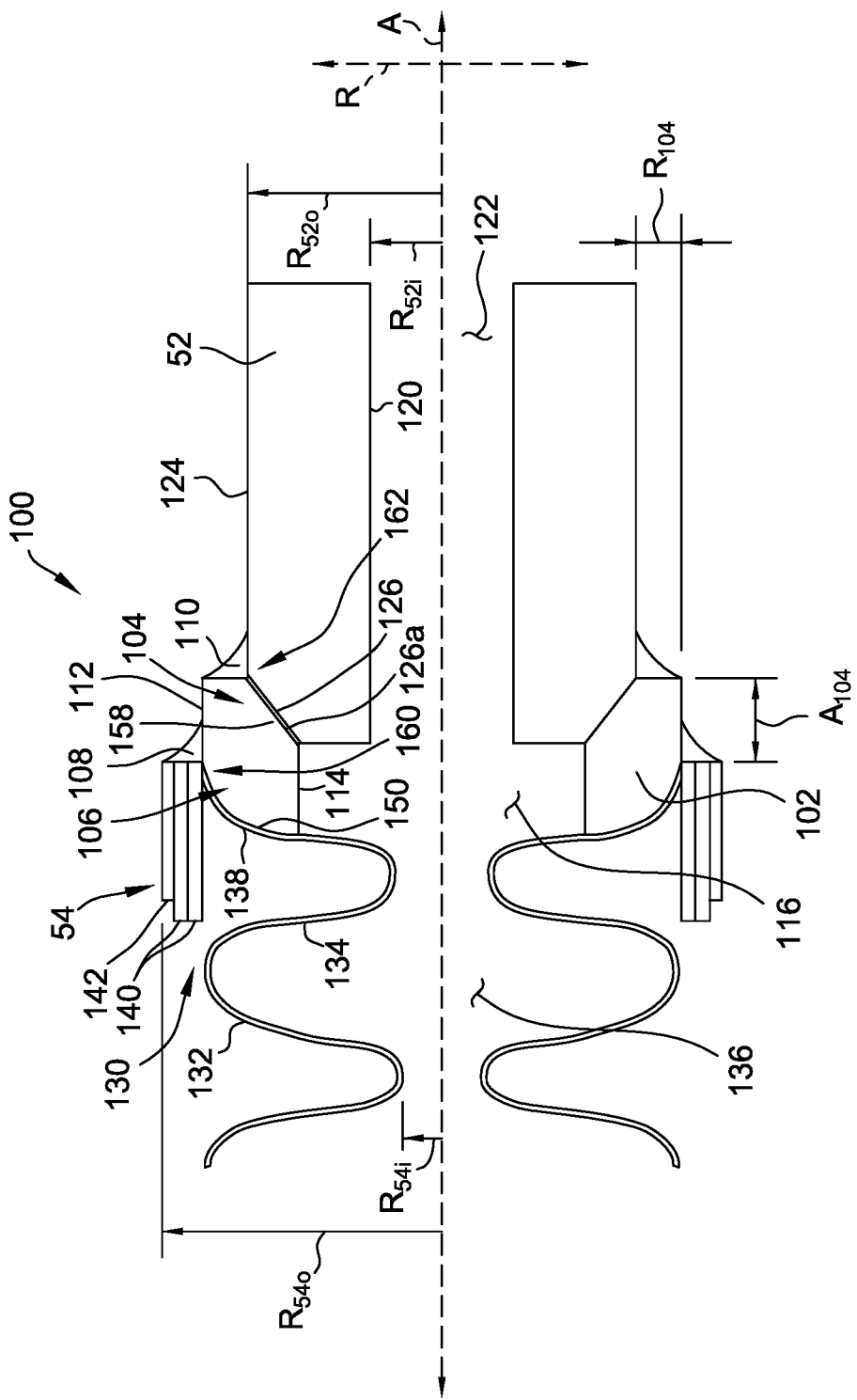
FIG. 3 is a cross-sectional view of an exemplary joint formed between a hose and a pipe including one embodiment of a transition assembly.

In some embodiments, contact surface 126 may be tapered, e.g., cone shaped, and may include an obliquely-oriented surface 126a see FIG. 3. More specifically, contact surface 126 may be tapered relative to the axial direction, and/or may be tapered relative to the inner surface 120 of the pipe 52. In some embodiments, contact surface 126 may not be tapered, e.g., the pipe contact surface 126 may be formed with a substantially constant radius $R_{52o}$, see FIG. 5. Alternatively, the pipe 52, and the pipe contact surface 126, may be any other type of pipe 52, having any suitable shape and/or dimension that enables the pipe 52 to be engaged with the transition assembly 102, as described herein.

The hose 54 may be a braided metal hose including one or more layers 130. In the exemplary embodiment, the hose 54 includes an inner layer 132 having an inner surface 134 that defines a hose passage 136. The inner layer 132 may be corrugated. For example, the inner layer 132 may have corrugations that are substantially parallel, e.g., the corrugations are independent and spaced a distance from adjacent corrugations. Alternatively, the inner layer 132 may have a helical corrugation e.g., the corrugation is formed as a continuous corrugation that spirals about the length of the hose 54. The hose 54 may include one or more braided layers and/or an armor 140. The one or more braided layers and/or an armor 140 may circumscribe the inner layer 132. The hose 54 may include a protective layer 142. The protective layer 142 may circumscribe the one or more braided layers 140 and/or the inner layer 132. The hose 54 may also include at least one hose contact surface 138 that engages the transition assembly 102 when the transition assembly 102 is fully coupled with the hose 54. The hose contact surface 138 may be a curved surface, e.g., the corrugated inner layer 132, but is not limited to only being a curved surface. The hose 54 includes an inner radius $R_{54i}$ and an outer radius $R_{54o}$.

The hose 54 may be flexible and/or the hose 54 may be rated for high-pressure applications. For example, the hose 54 may be rated for pressures up to 310 Bar (1500° F.), 365 bar (1500° F.), and/or 827 bar (1500° F.). Alternatively, the hose 54 may be any other type of hose, having any suitable shape and/or dimension, that enables the hose 54 to be engaged with the transition assembly 102, as described herein.

Figure 4:
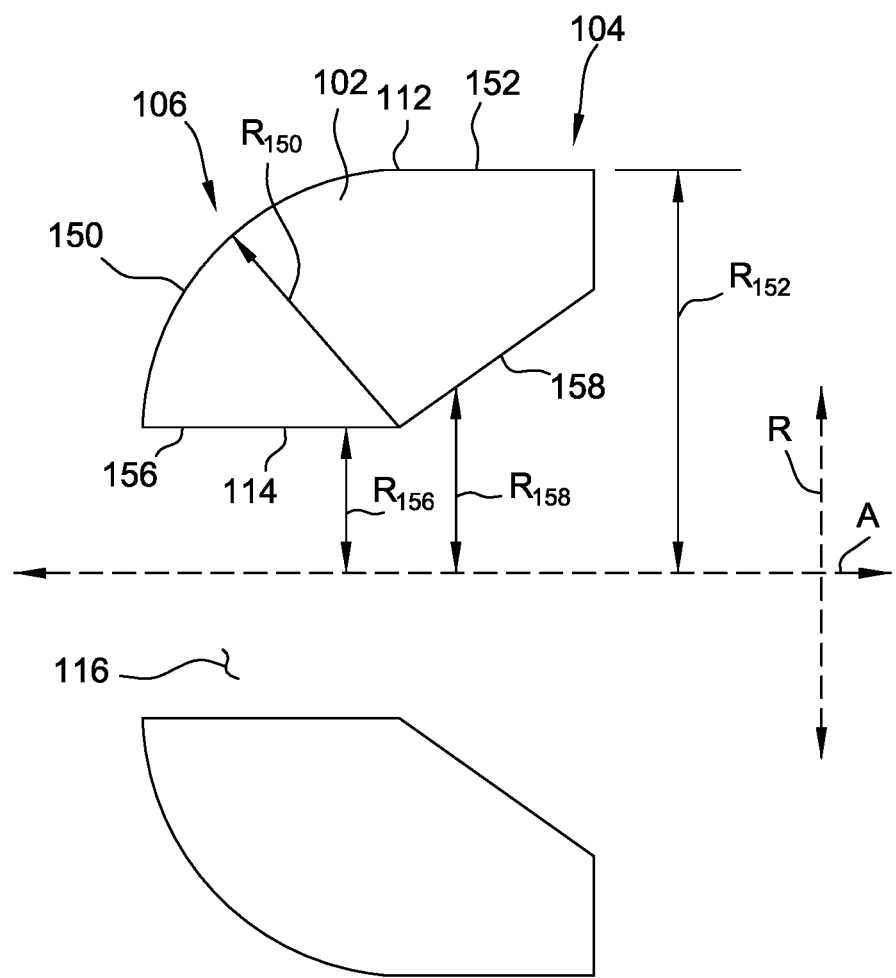
FIG. 4 is a detailed cross-sectional view of the transition assembly shown in FIG. 3.
Figure 5:
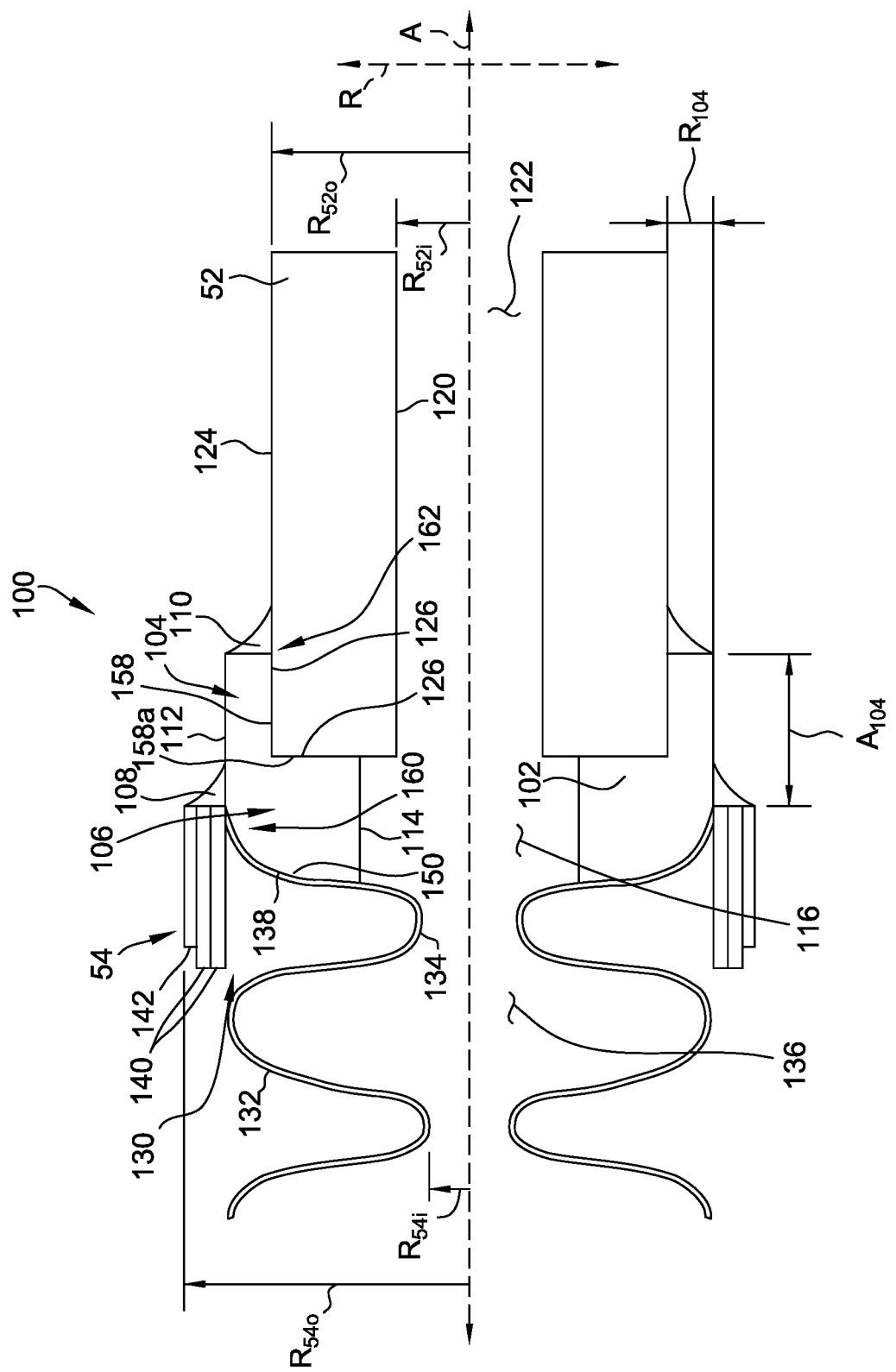
FIG. 5 is a cross-sectional view of an exemplary joint formed between a hose and a pipe including an alternative embodiment of a transition assembly.
Figure 6:
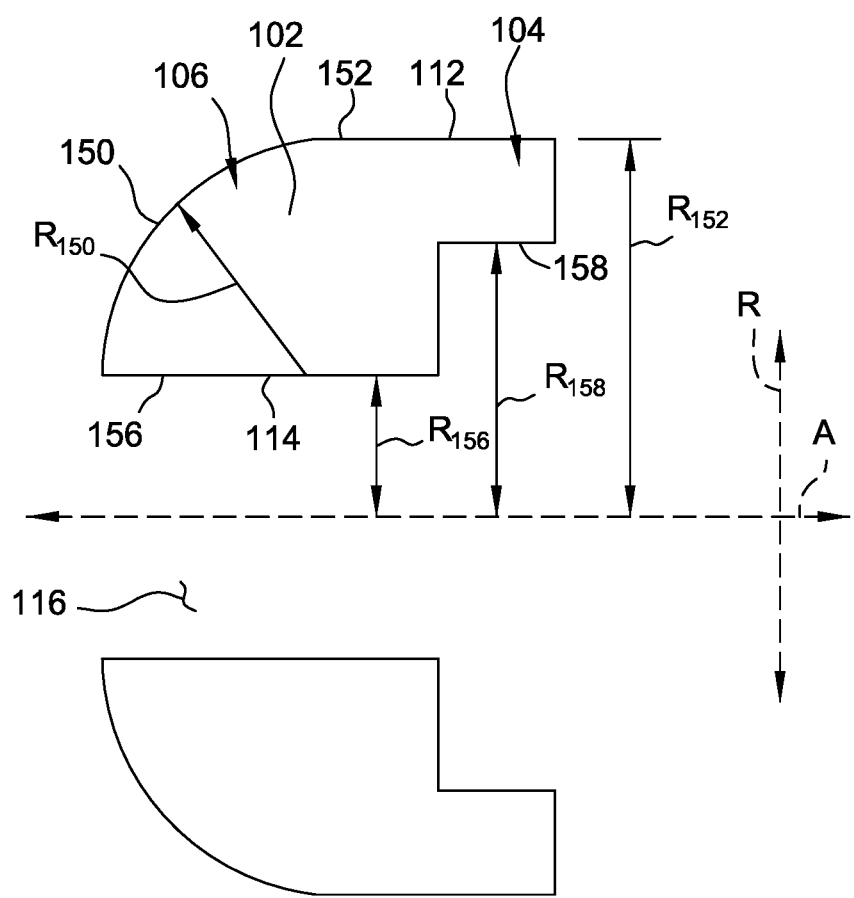
FIG. 6 is a detailed cross-sectional view of the transition assembly shown in FIG. 5.

With reference to FIG. 4, in the exemplary embodiment, the hose end 106 includes a first outer surface 150 and a first inner surface 156, and the pipe end 104 includes a second outer surface 152 and a second inner surface 158. The first outer surface 150 may be shaped complementary to the hose contact surface 138, and the second inner surface 158 may be shaped complementary to the pipe contact surface 126. For example, the first outer surface 150 may be shaped to contact the hose contact surface 138 and the second inner surface 158 may be shaped to contact the pipe contact surface 128. The first outer surface 150 and the second inner surface 158 may be shaped to conform to the contact surfaces 138, 126, respectively, as described below.

The first inner surface 156 may be formed with a radius $R_{156}$, and the second inner surface 158 may be formed with a radius $R_{158}$ that in the exemplary embodiment is different than radius $R_{156}$. For example, the radius $R_{158}$ may be greater than radius $R_{156}$. The radius $R_{156}$ and the radius $R_{158}$ may be substantially constant or, alternatively, may vary to form a tapered slope, relative to the axial direction A. In some embodiments, the radius $R_{156}$ and/or the radius $R_{158}$ may be approximately the same as the $R_{52i}$ of the pipe 52 and/or the $R_{54i}$ of the hose 54.

When the hose 54 is engaged with the transition assembly 102, a hose boundary connection 160 is formed between the first outer surface 150 and the hose contact surface 138. Similarly, when the pipe 52 is engaged with the transition assembly 102, a pipe boundary connection 162 is formed between the second inner surface 158 and the pipe contact surface 126. The hose boundary connection 160 and the pipe boundary connection 162 are separated by at least one of the axial distance $A_{104}$ and/or the radial distance $R_{104}$.

In the exemplary embodiments, the pipe end 104 is sized and shaped to circumscribe a portion of the outer surface 124 of the pipe 52, e.g., a portion of the pipe 52 may be disposed within the transition assembly passage 116, such that the second inner surface 158 of the transition assembly 102 may contact the pipe contact surface 126 of the pipe 52. The hose end 106 is sized and shaped to fit within the hose passage 136, and the first outer surface 150 may contact the hose contact surface 138 of the hose 54, as will be described in more detail below. Alternatively, in some other embodiments, the pipe end 104 may be sized and shaped to fit within the pipe passage 122, and the hose end 106 may be sized and shaped to circumvent the exterior of the hose 54, e.g., a portion of the hose 54 may be disposed within the transition assembly passage 116.

In the exemplary embodiment, the first outer surface 150 is sized and shaped to engage the inner layer 132 of the hose 54. For example, surface 150 may engage layer 132 in a friction fit, a press fit, a clearance fit, a transition fit, and/or any other engagement that enables assembly 102 to function as described herein. The fits and tolerance may be selected according to ISO standards and/or ANSI standards, for example. The clearance defined between the first outer surface 150 and the inner surface 134 may be any suitable clearance necessary for best practices for press-fit assemblies. In the exemplary embodiment, the first outer surface 150 is sized and shaped complementary to the hose contact surface 138 of the hose 54. For example, the hose contact surface 138 of the hose 54 may be corrugated, as described above, and the first outer surface 150 may have a radius $R_{150}$ that is substantially similar to, or less than a radius of curvature of a corrugation of the hose 54. The first outer surface 150 may be smooth, and formed without sharp corners or edges, to prevent the first outer surface 150 from deforming or puncturing the hose 54, e.g., puncturing the inner layer 132 of the hose 54. For example, the first outer surface 150, and/or the first inner surface 156, may include one or more rounded edges. In addition, the first outer surface 150 may be shaped to reduce stress concentrations from forming between the first outer surface 150 and the hose 54.

The second inner surface 158 is sized and shaped to engage with the pipe contact surface 126 of the pipe 52. For example, surface 158 may engage pipe contact surface 126 in a friction fit, a press fit, a clearance fit, a transition fit, and/or any other engagement that enables assembly 102 to function as described herein. The fits and tolerance may be selected according to ISO standards and/or ANSI standards, for example. The clearance between the second inner surface 158 and the pipe contact surface 126 may be any suitable clearance necessary for best practices for press-fit assemblies. In the exemplary embodiment, the second inner surface 158 is sized and shaped complementary to the one or more pipe contact surfaces 126 of the pipe 52. For example, the second inner surface 158 may be tapered to match the obliquely-oriented pipe contact surface 126a. See FIG. 3. In another embodiment, the second inner surface 158 may be cylindrical to match with the cylindrical pipe contact surface 126. See FIG. 5. The second inner surface 158 may be any suitable shape and size such that the second inner surface 158 may contact the pipe contact surface 126 with limited clearance. The second inner surface 158 may be any suitable shape and size such that at least a portion of the pipe 52 may be press fit within the transition assembly passage 116 defined by the second inner surface 158. In some embodiments, the second inner surface 158 includes a secondary surface 158a that contacts the pipe 52, restricting further insertion of the pipe 52 into transition assembly passage 116. See FIG. 5. In some embodiments, the secondary surface 158a is annular in shape, matching the annular surface of the pipe 52.

Figure 7:
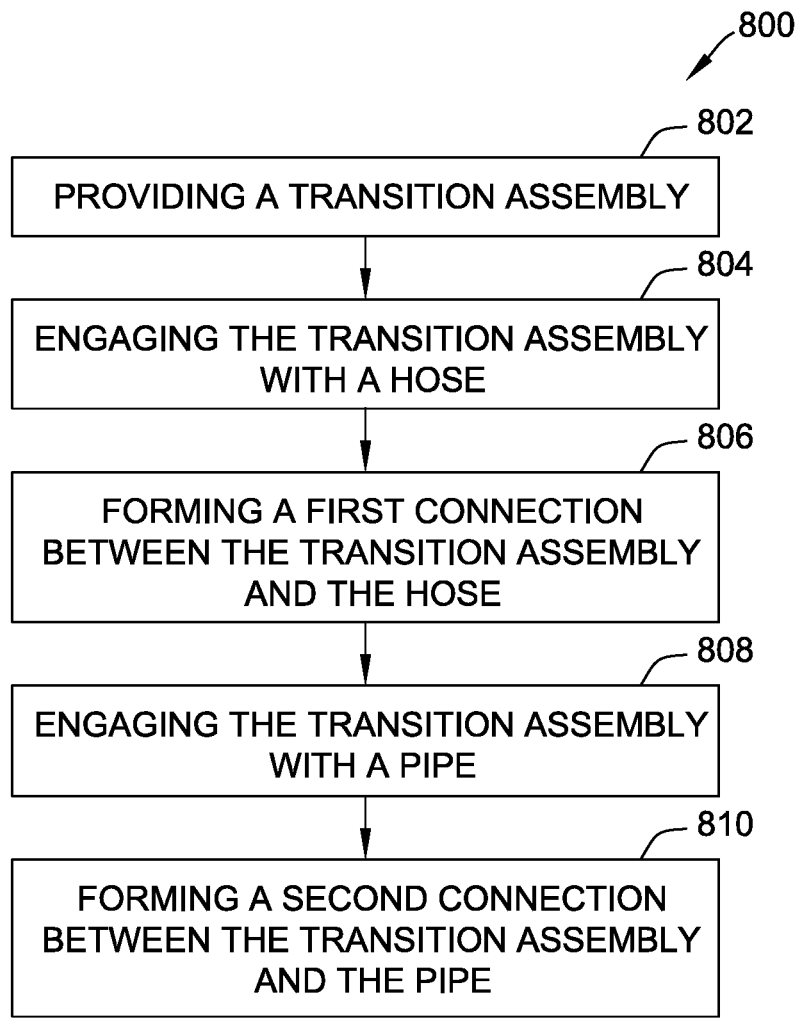
FIG. 7 is a flowchart of an exemplary method of forming a joint using a transition assembly.

FIG. 7 illustrates an exemplary method 800 of forming a joint between a hose, e.g., hose 54, and a pipe, e.g., pipe 52, is provided. For the purposes of discussion, the method 800 is described in conjunction with the components described in FIGS. 1-6. However, it should be noted that method 800 is not limited to only being used with the components described herein. In the exemplary embodiment, the method 800 includes providing 802 the transition assembly 102 including the hose end 106 and the pipe end 104. In an alternative embodiment, the method 800 may also include forming the transition assembly 102 via a machining process, a lathing process, and/or a casting process. A machining process may be used to bore out the transition assembly passage 116, e.g., to smooth and form the inner surfaces 156, 158, and/or to smooth and to form the outer surfaces 150, 152 of the transition assembly 102.

Method 800, in the exemplary embodiment, includes engaging 804 the hose end 106 of the transition assembly 102 with the hose 54 to form the hose boundary connection 160. In some cases, engaging 804 the transition assembly 102 with the hose 54 may include inserting the hose end 106 into the hose passage 136. When the transition assembly 102 is fully engaged 804 with the hose 54, the inner layer 132 of the hose 54 may contact at least a portion of the first outer surface 150 of the hose end 106. Engaging 804 the transition assembly 102 with the hose 54 may also include press-fitting the hose end 106 into the hose passage 136 such that an interference fit, or any suitable fit, is created between the first outer surface 150 of the transition assembly 102 and the hose contact surface 138 of the hose 54. The fit created between the hose end 106 and hose passage 136 facilitates retaining the position of the hose 54 and the transition assembly 102 in alignment. In some embodiments, engagement between the transition assembly 102 and the hose 54 may not be necessarily fixedly secured in position, such that the position of the hose 54 and the transition assembly 102 is retained, but in a fit that is not tight enough to create a seal between the hose 54 and transition assembly 102 that would prevent leakage of a fluid, (e.g., a liquid and/or a gas). Alternatively, engagement between the transition assembly 102 and the hose 54 may retain the position of the hose 54 and the transition assembly 102 and create a seal between the hose 54 and the transition assembly 102.

After the transition assembly 102 is fully engaged with the hose 54, method 800 includes forming 806 the hose connection 108 between the transition assembly 102 and the hose 54. In the exemplary embodiment, the hose connection 108 creates a seal that prevents leakage of fluid, at the hose boundary connection 160 between the transition assembly 102 and the hose 54. The hose connection 108 may also rigidly connect the hose 54 and the transition assembly 102, preventing relative motion, e.g., axial translation and/or rotation, between the hose 54 and the transition assembly 102. Forming 806 the hose connection 108 between the hose 54 and the transition assembly 102 may include one or more of the following processes: welding, brazing, and/or soldering. For example, forming 806 the hose connection 108 may include heating adjacent components above or below, the melting point of the material of the components. In another example, forming 806 may include heating and/or melting a material and placing the melted material on both components. Cooling of the melted material forms the hose connection 108 between the two components.

Method 800 also includes engaging 808 the pipe end 104 of the transition assembly 102 with the pipe 52 to form the pipe boundary connection 162. In some cases, engaging 808 the transition assembly 102 with hose 54 includes inserting at least a portion of the pipe 52 into the transition assembly passage 116. When the pipe 52 is inserted into the transition assembly passage 116, a portion of the second inner surface 158 of the transition assembly 102 may contact the pipe contact surface 126 of the pipe 52. Engaging 809 the transition assembly 102 with the pipe 52 may include press-fitting the pipe 52 within the transition assembly passage 116 creating an interference fit, or any suitable fit, between second inner surface 158 of the transition assembly 102 and the pipe contact surface 126 of the pipe 52, thus retaining the position of the pipe 52 and the transition assembly 102. In some cases, engagement between the transition assembly 102 and the pipe 52 may not be necessarily tight, e.g., the engagement may retain the position of the pipe 52 and the transition assembly 102, but in a fit that is not tight enough to create a seal between the pipe 52 and transition assembly 102 that would prevent leakage of a fluid (e.g., a liquid and/or a gas). Alternatively, engagement between the transition assembly 102 and the pipe 52 may retain the position of the pipe 52 and the transition assembly 102 and create a seal between the pipe 52 and the transition assembly 102.

After the transition assembly 102 is engaged 808 with the pipe 52, method 800 includes forming 810 the pipe connection 110 between the transition assembly 102 and the pipe 52. The pipe connection 110 may create a seal, preventing leakage of a fluid, at the pipe boundary connection 162 between the transition assembly 102 and the pipe 52. The pipe connection 110 may also rigidly connect the pipe 52 and the transition assembly 102, preventing relative motion, e.g., axial translation and/or rotation, between the pipe 52 and the transition assembly 102. Forming 810 the pipe connection 110 between the pipe 52 and the transition assembly 102 may include one or more of the following processes: welding, brazing, and/or soldering. For example, forming 810 the pipe connection 110 may include heating adjacent components above or below, the melting point of the material of the components. In another example, forming 810 may include heating and/or melting a material and placing the melted material on both components. Cooling the melted material forms a connection between the two components.

Forming 810 the pipe connection 110 and/or the hose connection 108, may include an automated operation, e.g., a welding operation, having one or more automated steps. The welding operation may include mounting, e.g., rigidly fixing, the transition assembly 102. The transition assembly 102 includes one or more mounting surfaces, e.g., the outer surface 112 and/or the inner surface 114, that may be gripped during mounting. The transition assembly 102 may be mounted using any suitable mounting mechanism, such as a clamp. The transition assembly 102 may be minimally deformed when mounted with a gripping force sufficient to maintain the position of the transition assembly 102 without causing significant deformation or deflection of the transition assembly 102. In particular, the gripping force does not cause deformation or deflection of the transition assembly 102, such that the transition assembly 102 would not be enabled to function as described herein, e.g., a significant deformation would cause the transition assembly 102 to not be able to be engaged with the hose 54 and/or the pipe 52. For example, the transition assembly 102 may have size and shape, e.g., a thickness, and/or is composed of a suitable material, steel, or steel alloy, such that the assembly may be mounted without being significantly deformed.

The transition assembly 102 may then be engaged with either or both of the hose 54 and the pipe 52, as described above, when the transition assembly 102 is mounted. In another example, the transition assembly 102 may be mounted before, or after, the transition assembly 102 is engaged with the hose 54 and/or the pipe 52.

The automated process(es) may include forming one or more tack welds. The tack welds may be formed using an arc welding process using electricity to weld the hose 54 to the transition assembly 102 and/or the pipe 53 to the transition assembly 102. The tack welds may be formed spaced apart about the circumference of the hose boundary connection 160 between hose 54 and the transition assembly 102, and/or the pipe boundary connection 162 between the pipe 52 and the transition assembly 102. In some embodiments, the tack welds may be formed by a manual welding process. The tack welds maintain the relative position between the hose 54 and the transition assembly 102 and/or the pipe 52 and the transition assembly 102 for a subsequent automated process.

The automated process(es) may be performed by an orbital welding machine. The machine may clamp the transition assembly 102. The machine may rotate the transition assembly 102 while forming a weld about the entire circumference of the hose boundary connection 160 between the transition assembly 102 and the hose 54 and/or the pipe boundary connection 162 between the transition assembly 102 and the pipe 52. Alternatively, and/or additionally, the machine forms the weld about the entire circumference of the hose and/or pipe boundary connections 160, 162 by rotating a welding arc about the transition assembly 102. In another example, the automated process(es) may be performed by any suitable robotic welding machine. In alternative embodiments, the hose and pipe connections 108, 110 may be formed using a manual welding operation.

Forming 804 the hose connection 108 and the pipe connection 110 includes forming 810 the hose connection 108 and pipe connection 110 at least one of an axial distance and/or a radial distance apart.

In some embodiments, forming the joint 100 includes forming a connection, e.g., boundary connection 160, 162, by engaging the pipe 52 and/or the hose 54 with the transition assembly 102, and then subsequently forming the hose connection 108 and/or the pipe connection 110 at the boundary connections 160, 162, respectively. In alternative embodiments, forming the joint 100 may include forming the boundary connection 160, 162, by engaging the pipe 52 and/or the hose 54 with the transition assembly 102.

Exemplary embodiments described herein relate to methods and systems for use in forming a joint, such as a sealed connection, between a pipe and a hose. The transition assembly, including a pipe connection end and an opposite hose connection end, maintains at least one of an axial separation and/or a radial separation, between the hose and the pipe. For example, the hose may be engaged with the transition assembly forming a hose boundary and the pipe may be engaged with the transition assembly forming a pipe boundary. Subsequently, two independent connections may be formed, i.e., a hose connection between the hose and the transition assembly and a pipe connection between the pipe and the transition assembly. The pipe and hose connections, e.g., welds, may be formed at the pipe boundary and the hose boundary such that the pipe and hose connections are spaced by at least one of an axial and/or radial distance apart. Accordingly, the first and second connections may be visually inspected, reformed, and/or tested, at least in part because the two connections are not overlapping. Furthermore, the transition assembly enables an automatic welding process to be performed at least because the transition assembly may be easily gripped by a mounting frame of the automatic welding machine.

Further aspects of the present disclosure are provided by the subject matter of the following clauses:

1. According to a first aspect, a method of connecting a pipe and a hose, said method comprising: providing a transition assembly including a hose end, a pipe end opposite the hose end, and an inner surface defining a transition assembly passage extending through the transition assembly from the hose end to the pipe end; engaging the hose end of the transition assembly with the hose such that a first connection is formed between the transition assembly and the hose; and engaging the pipe end of the transition assembly with the pipe such that a second connection between the transition assembly and the pipe is formed, wherein the second connection is spaced an axial distance from the first connection.

2. The method according to Clause 1, wherein engaging the pipe end of the transition assembly includes forming the second connection a radial distance from the first connection.

3. The method according to any preceding clause, wherein engaging the hose end of the transition assembly includes inserting at least a portion of the hose end of the transition assembly within a passage defined within the hose.

4. The method according to any preceding clause, wherein engaging the pipe end of the transition assembly includes inserting at least a portion of the pipe within the transition assembly passage.

5. The method according to any preceding clause, forming a pipe connection at the first connection; and forming a hose connection at the second connection.

6. The method according to any preceding clause, wherein forming the pipe connection and the hose connection includes at least one of brazing, welding, and soldering.

7. The method according to any preceding clause, wherein forming the pipe and hose connections includes forming a fillet weld.

8. The method according to any preceding clause, wherein forming the pipe and hose connection comprises: mounting the transition assembly to a mounting frame; inserting at least a portion of the transition assembly within a hose passage; forming at least one tack weld between the transition assembly and the hose; and forming a circular weld that circumscribes the transition assembly using an automated orbital welding device.

9. The method according to any preceding clause, wherein forming the at least one tack weld includes forming the at least one tack weld using arc welding.

10. According to another aspect of the disclosure, a transition assembly for connecting a pipe to a hose, the transition assembly comprises: a pipe end formed with a first surface that is shaped complementary to a pipe contact surface of the pipe; an opposite hose end formed with a second surface that is shaped complementary to a hose contact surface of the hose; and an inner surface defining a transition assembly passage that extends between the pipe and hose ends, and wherein a first connection is formed when the hose is engaged with the hose end and a second connection is formed when the pipe is engaged with the pipe end, wherein the second connection is spaced an axial distance from the first connection.

11. The transition assembly according to Clause 10, wherein the first surface includes a curved surface formed with a radius of curvature that substantially matches a radius of curvature of the hose contact surface.

12. The transition assembly according to any of Clauses 10-11, wherein the second surface includes a cylindrical surface formed with having a radius of curvature that substantially matches a radius of curvature of the pipe contact surface of the hose.

13. The transition assembly according to any of Clauses 10-12, wherein the inner surface includes a first inner surface formed with a first radius and a second inner surface formed with a second radius that is different than the first radius.

14. The transition assembly according to any of Clauses 10-13, wherein the inner surface and an outer surface each include at least one rounded edge.

15. According to another aspect of the disclosure, a connection system for connecting a hose and a pipe, the connection system comprising: a pipe including an outer surface having a pipe contact surface and an inner surface defining a pipe passageway; and a hose including an inner layer and at least one secondary layer, wherein the inner layer includes a hose contact surface and defines a hose passage; and a transition assembly comprising: a pipe end formed with a first surface that is shaped complementary to the pipe contact surface of the pipe; an opposite hose end formed with a second surface that is shaped complementary to the hose contact surface of the hose; and an inner surface defining a transition assembly passage that extends between the pipe and hose ends, and wherein a first connection is formed when the hose is engaged with the hose end and a second connection is formed when the pipe is engaged with the pipe end, wherein the second connection is spaced an axial distance from the first connection.

16. The connection system of Clause 15, wherein the first surface includes a curved surface formed with a radius of curvature that substantially matches a radius of curvature of the hose contact surface.

17. The connection system of any of Clauses 15-16, wherein the second surface includes a cylindrical surface formed with having a radius of curvature that substantially matches a radius of curvature of the pipe contact surface of the pipe.
18. The connection system of any of Clauses 15-17, wherein the second surface includes a cylindrical surface formed with having a radius of curvature that substantially matches a radius of curvature of the pipe contact surface of the pipe.
19. The connection system of any of Clauses 15-18, wherein the connection system further comprises: a pipe connection formed at the first connection; and a hose connection formed at the second connection.
20. The connection system of any of Clauses 15-19, wherein forming the pipe connection and the hose connection includes at least one of brazing, welding, and soldering.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments of systems and methods, including the best mode, and also to enable any person skilled in the art to practice the systems and methods, including making and using any devices or systems and performing any incorporated methods. The patentable scope of the systems and methods is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A connection system for connecting a hose and a pipe, the connection system comprising:
   a pipe including an outer surface having a pipe contact surface and an inner surface defining a pipe passageway; and
   a hose including a corrugated inner layer and at least one secondary layer positioned radially outward from the corrugated layer, wherein the inner layer includes a hose contact surface and defines a hose passage; and
   a transition assembly comprising:
      a pipe end formed with a first surface that is shaped complementary to the pipe contact surface of the pipe;
      an opposite hose end formed with a second surface that is shaped complementary to the hose contact surface of the hose; and
      an inner surface defining a transition assembly passage that extends between the pipe and hose ends, and wherein a first connection is formed when the hose is engaged with the hose end and a second connection is formed when the pipe is engaged with the pipe end, wherein the second connection is spaced an axial distance from the first connection, wherein when the second surface is in contact with the hose contact surface, the second surface is positioned adjacent to the at least one secondary layer.
2. The connection system of claim 1, wherein the first surface includes a curved surface formed with a radius of curvature that substantially matches a radius of curvature of the hose contact surface.
3. The connection system of claim 1, wherein the second surface includes a cylindrical surface formed with having a radius of curvature that substantially matches a radius of curvature of the pipe contact surface of the pipe.
4. The connection system of claim 1, wherein the inner surface includes a first inner surface formed with a first radius and a second inner surface formed with a second radius that is different than the first radius.
5. The connection system of claim 1, wherein the connection system further comprises:
   a pipe connection formed at the first connection; and
   a hose connection formed at the second connection.
6. The connection system of claim 5, wherein forming the pipe connection and the hose connection includes at least one of brazing, welding, and soldering.
7. A method of connecting a pipe and a hose including a corrugated layer and at least one secondary layer positioned radially outward from the corrugated layer, said method comprising:
   providing a transition assembly including a hose end including a second surface that is shaped complementary to a hose contact surface of the corrugated layer of the hose, a pipe end opposite the hose end, and an inner surface defining a transition assembly passage extending through the transition assembly from the hose end to the pipe end;
   engaging the hose end of the transition assembly with the hose such that a first connection is formed between the transition assembly and the hose, wherein when the second surface is in contact with the hose contact surface, the second surface is positioned adjacent to the at least one secondary layer; and
   engaging the pipe end of the transition assembly with the pipe such that a second connection between the transition assembly and the pipe is formed, wherein the second connection is spaced an axial distance from the first connection.
8. The method according to claim 7, wherein engaging the pipe end of the transition assembly includes forming the second connection a radial distance from the first connection.
9. The method according to claim 7, wherein engaging the hose end of the transition assembly includes inserting at least a portion of the hose end of the transition assembly within a passage defined within the hose.
10. The method according to claim 7, wherein engaging the pipe end of the transition assembly includes inserting at least a portion of the pipe within the transition assembly passage.
11. The method according to claim 7, wherein the method further comprises:
   forming a pipe connection at the first connection; and
   forming a hose connection at the second connection.
12. The method according to claim 11, wherein forming the pipe connection and the hose connection includes at least one of brazing, welding, and soldering.
13. The method according to claim 7, wherein forming the pipe and hose connections includes forming a fillet weld.
14. The method according to claim 7, wherein forming the pipe and hose connection comprises:
   mounting the transition assembly to a mounting frame;
   inserting at least a portion of the transition assembly within a hose passage;
   forming at least one tack weld between the transition assembly and the hose; and
   forming a circular weld that circumscribes the transition assembly using an automated orbital welding device.

15. The method according to claim 14, wherein forming the at least one tack weld includes forming the at least one tack weld using arc welding.

16. A transition assembly for connecting a pipe to a hose including a corrugated layer and at least one secondary layer positioned radially outward from the corrugated layer, the transition assembly comprises:
- a pipe end formed with a first surface that is shaped complementary to a pipe contact surface of the pipe;
- an opposite hose end formed with a second surface that is shaped complementary to a hose contact surface of the corrugated layer of the hose; and
- an inner surface defining a transition assembly passage that extends between the pipe and hose ends, and wherein a first connection is formed when the hose is engaged with the hose end and a second connection is formed when the pipe is engaged with the pipe end, wherein the second connection is spaced an axial distance from the first connection, wherein when the second surface is in contact with the hose contact surface, the second surface is positioned adjacent to the at least one secondary layer.

17. The transition assembly according to claim 16, wherein the first surface includes a curved surface formed with a radius of curvature that substantially matches a radius of curvature of the hose contact surface.

18. The transition assembly according to claim 16, wherein the second surface includes a cylindrical surface formed with having a radius of curvature that substantially matches a radius of curvature of the pipe contact surface of the hose.

19. The transition assembly according to claim 16, wherein the inner surface includes a first inner surface formed with a first radius and a second inner surface formed with a second radius that is different than the first radius.

20. The transition assembly according to claim 16, wherein the inner surface and an outer surface each include at least one rounded edge.

* * * * *